May 27, 1958 J. M. RAKUS 2,836,388
VALVE
Filed Sept. 6, 1957
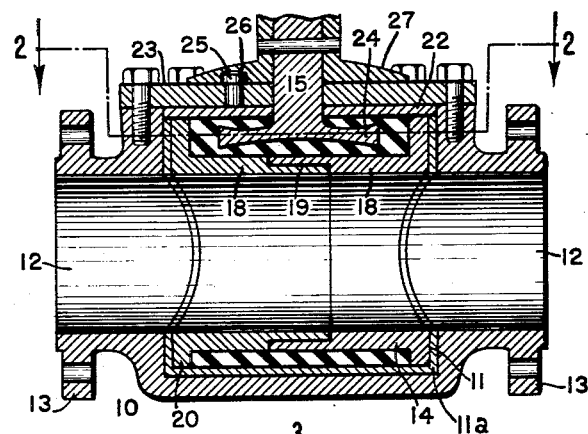
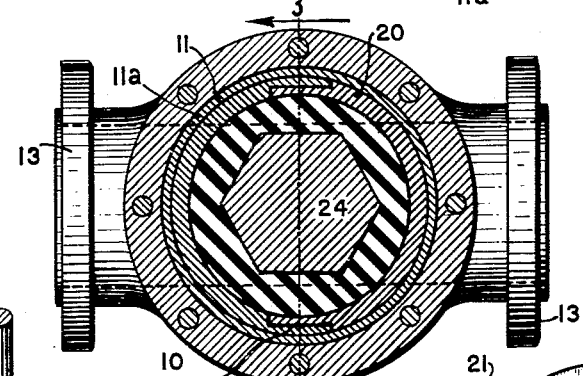
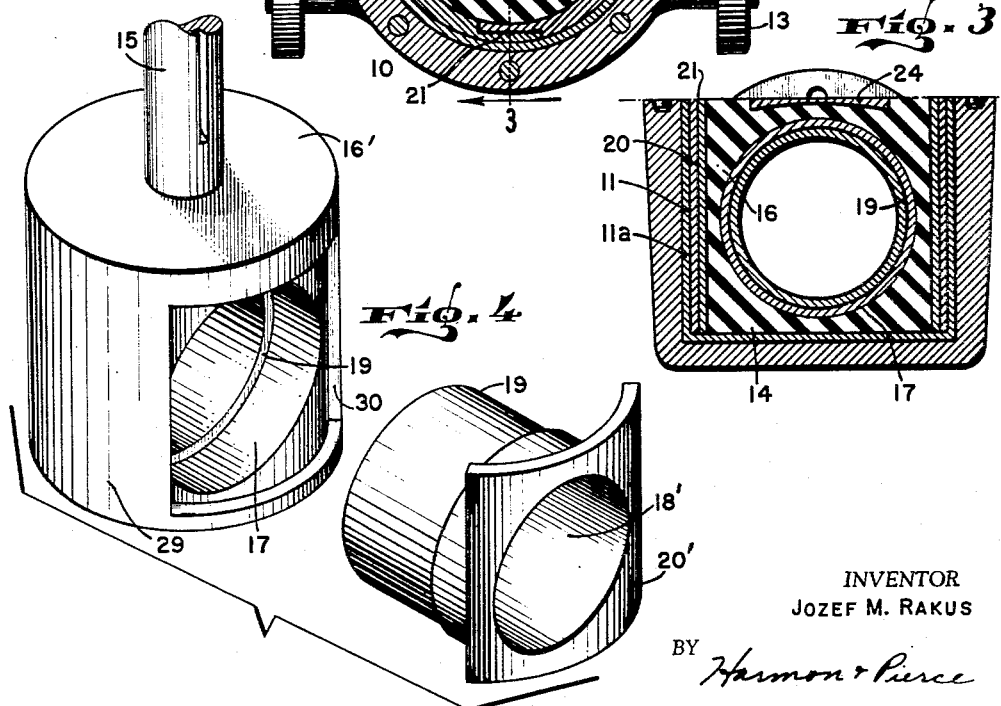
INVENTOR
JOZEF M. RAKUS
BY *Harmon + Pierce*
ATTORNEYS United States Patent Office 2,836,388
Patented May 27, 1958

2,836,388

VALVE

Jozef M. Rakus, Plainfield, N. J.

Application September 6, 1957, Serial No. 682,509

13 Claims. (Cl. 251—182)

This invention relates to improvements in pipeline valves generally, and more particularly, to a novel means embodying non-metallic plastic material in such valves for maintaining a positive seal between the valve body and the valve chamber.

It is an object of the present invention to provide a valve which is simple and economical to manufacture and yet will insure a completely leakproof structure.

Another object of this invention is to provide a high pressure valve of the plug type, in which the plug is cylindrical rather than tapered and is easily rotated to either open or closed position.

A further important object of the present invention is to provide a pipeline valve in which the valve body chamber is formed with a finished liner of a suitable alloy or is chromium plated, and in which the plug is expandible to insure a leakproof structure and yet is easily rotatable to open and closed positions.

Another important object of this invention is to provide in a plug valve with a full size through passage in the plug simple and effective means at the contiguous cylindrical surfaces of the valve chamber and plug for reducing to a minimum the erosion of the material of the valve by the substance passing through the valve when the plug is moved to or from one position of opening or closure to another position.

A still further object of the invention is the provision of a valve consisting of compartively few parts in compact arrangement, easily adaptable to either manual or power operation, economical to produce, and having a long life without the necessity of lubrication or other maintenance servicing.

Other objects and advantages will become apparent from the following description of embodiments of the present invention illustrated in the accompanying drawing, and in which:

Figure 1 is a longitudinal vertical central section of the valve showing the plug in fully open position;

Figure 2 is a horizontal sectional view of the upper or stem end portion of the valve, the section being taken on the lines 2—2 of Figure 1;

Figure 3 is a transverse vertical sectional view taken on the lines 3—3 of Figure 2; and Figure 4 is an enlarged, perspective, partly exploded view of a modified form of valve plug.

In the drawing like reference numerals relate to like or similar parts throughout the views.

Referring to Figures 1 to 3, the valve unit 10 comprises a cast or forged body provided with a cylindrical chamber 11 and diametrically opposed inlet and outlet ports 12, suitable flanges 13 being provided for coupling the same to a pipeline or lines or other forms of conduit. A cylindrical valve plug 14 is located in the chamber 11 and rotatable therein by means of a stem 15 secured to the upper end thereof. The valve chamber may be chromium plated or otherwise made resistant to wear as by a brass or bronze liner 11a.

The valve plug 14 comprises a pliable cylindrical core 16 formed of resilient material such as natural or hypalon rubber, Teflon, Neoprene, or similar material, and which is provided with a transverse passage 17 for the reception of two metallic tubes 18. These tubes at their inner, adjacent ends are telescoped together as at 19. At their outer ends the tubes 18 are provided with semi-cylindrical flanges 20 conforming to the wall of the chamber 11. The flanges 20 closely confine the pliable cylinder 16 and, at their meeting edges, are telescoped with respect to each other as indicated at 21. The kind of pliable material employed for the cylinder 16 will of course depend on the particular liquid transmitted, as well as working temperature and pressure.

Above the valve plug there is provided a sealing element in the form of a pliable washer 22 upon which pressure may be exerted by the bonnet 23, and through which the operating stem 15 extends. The stem is provided at its inner end with a polygonal head 24 imbedded in the pliable cylinder 16, and at its upper end (not shown) is formed or provided with any desired means for manual or power operation as is well known in the art. Means for limiting rotation of the valve to a quarter turn may be in any form desired. As here illustrated a pin 25 and groove or slot 26 are provided, the pin 25 being inserted in the upper face of the bonnet and the slot or groove 26 being formed in the lower face of a disc or flange 27 secured to the stem 15. The slot 26 is arcuate in form and substantially 90° in extent.

In the modified form of valve plug shown in Figure 4, the construction is generally the same as in Figures 1 to 3. In this form, however, the flanges 20' of the tubes 18' are fore-shortened so as not to provide meeting telescoping edges, and the pliable core 16' is extended radially at the lateral portions 29 to conform to the inner cylindrical wall of the valve chamber 11. These portions 29 are thus arranged to provide the necessary seal at the ports 12 when the valve plug is turned to the closed position. The core 16' is provided with window-like recesses 30 to receive the flanges 20'.

A construction similar to the above could be employed in constructing a ball valve, the pliable material being of ball-like form with the metallic tubular elements inserted therein to form the flow passage.

By reason of the provision of the resilient core in both forms of construction, the flanged tubes of the valve plug are constantly urged into substantially fluid tight engagement with the wall of the cylindrical main chamber of the valve body, to provide the necessary sealing engagement.

It will also be noted that the passages through the valve body and plug are full size, that is, of uniform diameter with the conduit in which the valve is to be employed. As is known in the art, an unobstructed full flow passage is much desired to eliminate damaging effect of churning or turbulence when the valve is used in lines handling abrasive-laden fluids at high pressures and velocities. Scrapers or the like may also be run through the lines provided with such valves without danger of damage to the same.

I claim:

1. A valve comprising a body provided with a cylindrical chamber and having a plurality of ports, a rotatable plug disposed in said chamber for opening and closing said ports, said plug including telescoping tubular members, arcuate flanges on the outer ends of said members, and resilient means between said flanges for urging said members into contact with the cylindrical wall of said chamber.

2. A valve as set forth in claim 1 wherein the cylindrical chamber of the body is faced with a copper alloy lining.

3. A valve as set forth in claim 1 wherein the cylindrical chamber is chrome faced.

4. A valve comprising a body provided with a cylindrical chamber and having a plurality of ports, a rotatable plug disposed in said chamber, said plug being formed of resilient material having an opening therethrough, tubular metallic inserts in said opening cooperating with said ports for opening and closing the same upon rotation of the plug, said resilient material urging the inserts into contact with the cylindrical wall of said chamber.

5. A valve as set forth in claim 4 wherein the cylindrical chamber is chrome faced.

6. A valve as set forth in claim 4 wherein the metallic inserts are of such extent as to telescope one into the other.

7. A valve as set forth in claim 6 wherein the cylindrical chamber is provided with a liner for reducing wear.

8. A valve comprising a body provided with a cylindrical chamber and having a plurality of ports extending therethrough, a rotatable plug disposed in said chamber, said plug being formed of resilient material having an opening extending transversely therethrough, tubular metallic inserts in said opening cooperating with said ports for opening and closing the same upon rotation of the plug, arcuate flanges on the outer ends of said inserts, said resilient material engaging the flanges for urging the inserts into contact with the cylindrical wall of said chamber.

9. A valve as set forth in claim 8 wherein the metallic inserts are of such length as to telescope one into the other.

10. A valve as set forth in claim 9 wherein the cylindrical chamber is provided with a liner for reducing wear.

11. A valve as set forth in claim 9 wherein the arcuate flanges also are of such extent as to telescope one into the other.

12. A valve comprising a body provided with a cylindrical chamber and having a plurality of ports, a rotatable plug disposed in said chamber for opening and closing said ports, said plug including a pair of oppositely disposed, axially aligned, abutting tubular members for forming a passage through said plug, said plug being of inherently resilient material for urging said members into contact with the cylindrical wall of said chamber.

13. A valve comprising a body provided with a cylindrical chamber and having a plurality of ports, an inherently resilient rotatable plug disposed in said chamber for opening and closing said ports, said plug including a pair of oppositely disposed, axially aligned, abutting tubular members to form a passage through said plug, said members being provided with arcuate seat engaging flanges encompassing the periphery of the resilient plug, the adjacent terminal portions of such flanges being in telescopic relationship.

References Cited in the file of this patent

UNITED STATES PATENTS

| | | |
|---|---|---|
| 1,840,498 | Froussard | Jan. 12, 1932 |
| 2,584,161 | Scherer | Feb. 5, 1952 |
| 2,735,645 | Freed | Feb. 21, 1956 |